UNITED STATES PATENT OFFICE.

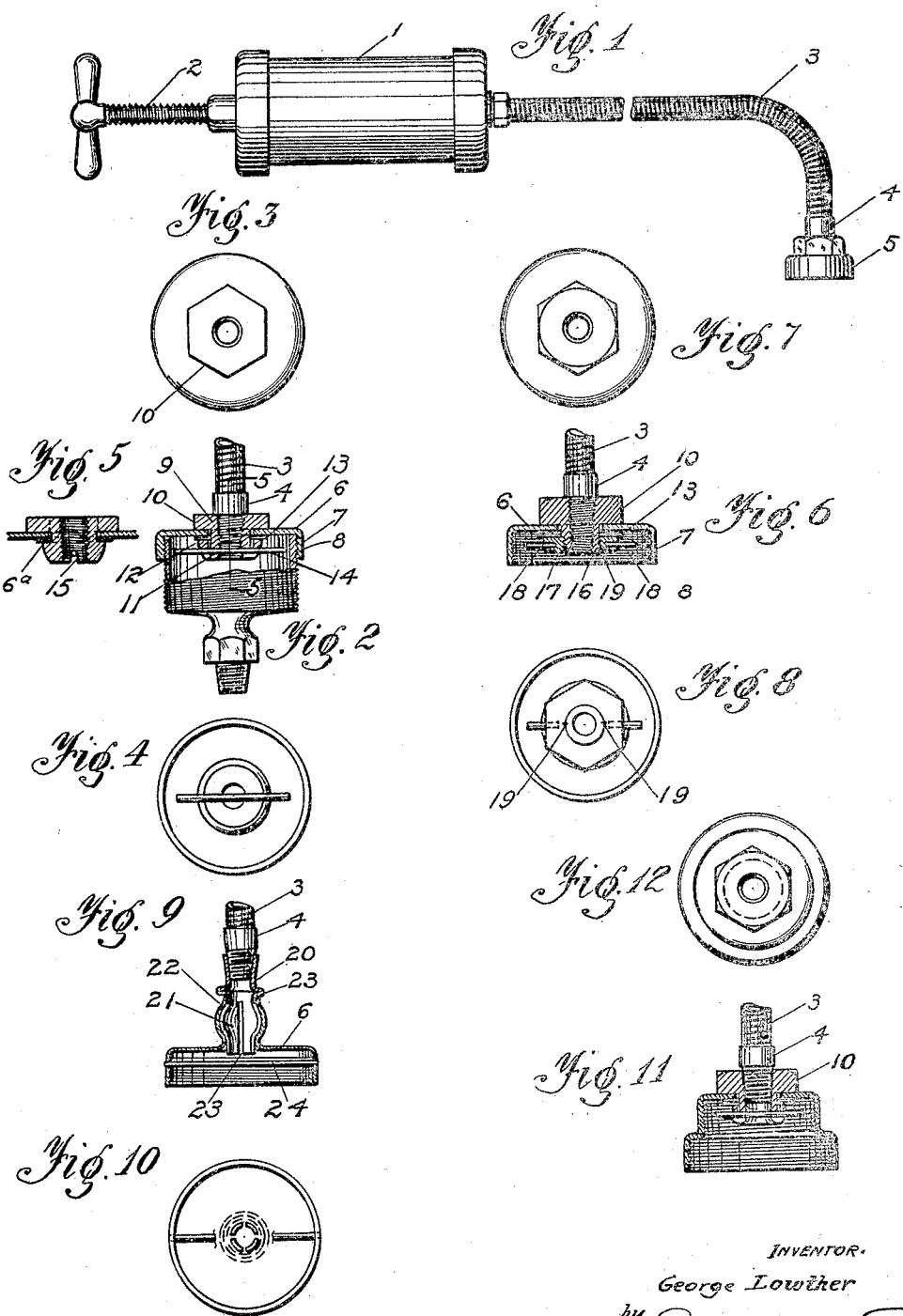

GEORGE LOWTHER, OF PITTSBURGH, PENNSYLVANIA.

CAP FOR GREASE-CUPS.

1,382,299.  Specification of Letters Patent.  Patented June 21, 1921.

Application filed July 12, 1920. Serial No. 395,620.

*To all whom it may concern:*

Be it known that I, GEORGE LOWTHER, a citizen of the United States, residing at Pittsburgh, in the county of Allegheny and State of Pennsylvania, have invented certain new and useful Improvements in Caps for Grease-Cups, of which the following is a specification.

This invention relates to caps for filling grease-cups and more particularly to caps used in connection with the well known grease guns now in general use for lubricating bearings in engines, especially automobile engines.

One of the main objects of the invention is to provide a device enabling the filling of the standard grease cups as now generally installed on engines with a grease gun. A further object is to enable such filling to be done with a minimum waste of material and time. Another object is to provide a device which will allow the filling of grease cups without undue soiling of the hands. A still further object is to provide a device of simple and cheap manufacture having the double characteristics of forcing the lubricant in the lubricating ducts and filling the cups compactly. Further objects and advantages will appear from the following description and from the drawings which form part of this application for Letters Patent.

In the drawings:—

Figure 1 is a general view showing a grease gun of usual design provided with a flexible feed tube having at its outer end a special cap made according to my invention.

Fig. 2 is a cross section through a cap of my invention applied to a grease cup of standard design, shown partly in section.

Fig. 3 is a top plan-view corresponding to Fig. 2.

Fig. 4 is a bottom plan-view of Fig. 2.

Fig. 5 is a partial cross-section taken along line 5—5 in Fig. 2, through the cap alone.

Fig. 6 is a cross-section through a modified construction of my invention.

Fig. 7 is a top plan view of Fig. 6.

Fig. 8 is a bottom plan view of Fig. 6.

Fig. 9 is a cross-section through another modified design of my invention.

Fig. 10 is a bottom plan view of Fig. 9.

Fig. 11 is a cross-section of a modified construction of my invention adaptable to cups of different diameters.

Fig. 12 is a top plan view of Fig. 11.

Referring more in detail to Fig. 1, 1 is the body or cylinder of an ordinary grease-gun, 2 is the pressure-screw which forces the grease from the cylinder into the flexible feed tube 3 at the end of which is secured the threaded nipple 4 to which the special cap 5, forming the object of my invention, is secured for the purpose of filling the various grease cups of an engine.

In the preferred construction of my caps shown in Fig. 2, the cover 6 is provided with a circular flange 7 threaded interiorly as shown at 8, to fit the thread of the grease cup to which it corresponds. A centrally threaded thimble 9 is centrally and rotatably secured on the cover 6 and is provided with an exterior polygonal head 10 for the purpose of presenting adequate gripping means for the jaws of the wrench, required when the cap is to be secured on the threaded nipple 4 of the feed tube. The sleeve 11 of the thimble passes through a circular hole 6ª of slightly greater diameter provided in the cover 6 and is made of sufficient length to allow the formation of a turned-up circular flange 12, the object of which is to retain a sealing washer 13, of leather, felt or other suitable material, which prevents the grease from escaping while the grease cup is being filled by means of the gun. As will be understood, the cover is rotatable around the thimble in order to allow the former to be screwed on the grease cup while the feed tube remains stationary.

The cap is made relatively shallow, the flange 7 being just deep enough to provide the necessary number of threads required to hold the cap securely on the grease cup and to eliminate the possibility of the compressed grease oozing out between the threads. This is done for the purpose of reducing the amount of grease adhering within the cap when the latter is removed after filling a cup. The cap is also supplied with a stiff wire pin 14, diametrically disposed and securely held within the slot 15 cut in flange 12; the length of this pin is such that it will be slightly less than the inside diameter of the cup which is to be filled. The purpose of this pin is to act as a wiper and to cut off the grease smoothly when the special filling cap is removed, thus leaving the grease cup free from depending grease and enabling the regular cap of the grease cup to be applied without wasting the lubricant or soiling one's fingers.

The modified construction of the cap shown in Fig. 6 differs from that shown in Fig. 2 in that the sealing washer 13 is held by a suitably threaded nut 17 which is screwed upon the partly threaded collar 16 a sufficient amount to hold the washer 13 amply tight to prevent the leakage of grease while at the same time allowing the rotation of the cover 6 around the thimble. This nut is locked in position by simply prick-punching the thread after assembling the parts, as indicated at 19. Also, owing to the requirements of this construction, the wiper 18 is preferably made of one or two pieces of stiff wire partly driven into the sides of the nut so as not to interfere with the rotation of the nut when the latter is being screwed upon the collar.

Figs. 9 and 10 represent another modified cap construction. In this design a special tubular connector 20, the upper end of which is tapped, is screwed upon the threaded nipple 4 of the grease-gun; the other end of the connector is expanded into a spherically shaped bulb 21 which is provided with a plurality of slots for the purpose of supplying the necessary resiliency required for pressing the bulb 21 into the conformingly shaped neck 22 extending outwardly from the cover 6. Intermediate the bulb and the threaded part of the connector 20 a collar 23 is expanded for the purpose of providing a suitable limiting stop to the introduction of the connector into its female counter-part 22 and also to provide a place for the application of the wrench required to screw the connector on the nipple 4. Like the other designs described above, this type of cap may also be provided with a grease wiper 24 as shown by the stiff wire extending diametrically within the cap. The principal features of this design are that of reducing to a minimum the number of parts and that the latter can be made of light tubing and sheet metal; moreover the caps may be quickly applied in a manner similar to that employed for the well known snap buttons.

Owing to the shallowness of the caps of my invention, it will be readily seen that any one of the designs described above may be modified so that one cap be applicable to various sizes of grease cups. The Figs. 11 and 12 show a modified cap having a similar thimble construction as shown in Fig. 2 but in which the cap proper has been stepped and threaded to accommodate two grease cups of different diameters. For the bigger sizes of grease cups (where the height of the cup body is great relatively to the depth of the threaded flange of the cap) it will be readily understood that my cap could be stepped to fit three or more sizes of cups, thus reducing the number of caps to be carried in stock.

I am aware of the fact that various devices have been employed to facilitate the lubrication of engine parts with the aid of a grease-gun; but all devices known to me require that the grease cups usually furnished on such engines be replaced by suitable couplings to correspond with another special coupling provided at the end of the feed tube of the grease-gun. This is of course an additional expense in labor and material which is greatly reduced with my device since any ordinary grease-gun, as now on the market or in use, may be employed and also because the grease cups placed on the engine need not be replaced by special fixtures.

Another advantageous feature of my invention is that on account of keeping the grease cups on the engine, the grease filling operation need not be done as frequently because the cups themselves act as a storage for the lubricant.

As will be understood, and as suggested herein, there may be slight changes made in the construction and arrangement of the various details of my invention without departing from the field and aims of the same, and I intend to include all such variations, as fall within the scope of the appended claims, in this application, in which the preferred forms only of my invention are disclosed.

What I claim is:—

1. In a cap for filling grease-cups, a cover, means for securing said cover to a grease-cup and to a concentrically disposed supply pipe, means for rotating said cover independently of and around said supply pipe, means for preventing the leakage of the lubricant during its compression into the grease-cup and means for leveling the grease in the grease-cup.

2. In a cap for filling grease-cups, a cover with an interiorly threaded circular flange, a thimble rotatively mounted upon and through the cover and centrally threaded for connection with a supply tube, said thimble having a polygonal exterior head and a sleeve bent back upon itself, a sealing washer secured intermediate said up-turned sleeve and cover and a wiper secured to said sleeve.

3. In a cap of the character described for filling grease-cups, a cover and means for selectively and removably securing said cover to grease-cups of different diameters.

4. In a cap for filling grease-cups of the character described, a cover, a depending circular flange provided with a plurality of circular steps severally threaded interiorly.

5. In a cap for filling grease-cups of the character described, a cover, a depending circular flange provided with a plurality of circular steps severally threaded interiorly; a thimble rotatively mounted upon and through the cover and centrally threaded for connection with a supply tube.

6. In a cap for filling grease-cups of the character described, a cover, a depending circular flange provided with a plurality of circular steps severally threaded interiorly; a thimble rotatably mounted upon and through the cover and centrally threaded for connection with a supply tube; and a wiper secured on said thimble and within said cup.

In testimony whereof I affix my signature.

GEORGE LOWTHER.